United States Patent
Kang

(10) Patent No.: US 8,768,387 B2
(45) Date of Patent: Jul. 1, 2014

(54) MESSAGE TRANSMITTING APPARATUS AND METHOD IN MOBILE COMMUNICATION TERMINAL

(75) Inventor: Mi-Jung Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1177 days.

(21) Appl. No.: 11/244,460

(22) Filed: Oct. 5, 2005

(65) Prior Publication Data

US 2006/0073842 A1 Apr. 6, 2006

(30) Foreign Application Priority Data

Oct. 5, 2004 (KR) .................. 10-2004-0079261

(51) Int. Cl.
| | | |
|---|---|---|
| H04W 4/12 | (2009.01) | |
| H04W 28/06 | (2009.01) | |
| H04N 1/00 | (2006.01) | |
| H04L 12/58 | (2006.01) | |
| H04M 1/725 | (2006.01) | |

(52) U.S. Cl.
CPC ........... *H04W 28/06* (2013.01); *H04N 1/00307* (2013.01); *H04L 12/5835* (2013.01); *H04N 2201/0025* (2013.01); *H04L 51/066* (2013.01); *H04L 12/5895* (2013.01); *H04M 1/72555* (2013.01); *H04M 1/72547* (2013.01)
USPC ........................................ 455/466; 455/412.1

(58) Field of Classification Search
USPC ....................... 455/466, 566, 412.1
See application file for complete search history.

(56) References Cited

U.S. PATENT DOCUMENTS

| | | | |
|---|---|---|---|
| 6,757,273 B1 * | 6/2004 | Hsu et al. ...................... 370/349 |
| 6,906,818 B1 * | 6/2005 | Makishima .................. 358/1.15 |
| 7,096,038 B1 * | 8/2006 | Perrella .......................... 455/557 |
| 7,218,919 B2 * | 5/2007 | Vaananen .................. 455/412.1 |
| 7,593,015 B2 * | 9/2009 | Rao ................................ 345/473 |
| 7,656,438 B2 * | 2/2010 | Ishii et al. .................. 348/231.1 |
| 2002/0006784 A1 * | 1/2002 | Kim .............................. 455/412 |
| 2002/0037745 A1 * | 3/2002 | Yahiro .......................... 455/557 |
| 2002/0058522 A1 * | 5/2002 | Kim et al. .................... 455/466 |
| 2002/0137544 A1 * | 9/2002 | Myojo .......................... 455/557 |
| 2003/0040300 A1 * | 2/2003 | Bodic et al. .................. 455/412 |

(Continued)

FOREIGN PATENT DOCUMENTS

| | | |
|---|---|---|
| CN | 1468495 | 1/2004 |
| EP | 1 244 258 A | 9/2002 |

(Continued)

*Primary Examiner* — Steven Kelley
(74) *Attorney, Agent, or Firm* — Lee, Hong, Degerman, Kang & Waimey

(57) ABSTRACT

The present invention relates to a message transmitting apparatus and method in a mobile communication terminal and solves the problem of a message transmission being stopped when a message size exceeds a message capacity is solved. Also, memory resources of the mobile communication terminal are more efficiently utilized because an additional memory region need not be allocated to a message to be transmitted. The apparatus comprises a message generating unit for generating a message, a buffer for temporarily storing the generated message, a controller for dividing the message stored in the buffer into data blocks, wherein the controller converts a format of the data blocks into a type capable of being transmitted or received via a network and stores the data blocks into a file, and a transmitter for transmitting the message comprising the data blocks having the converted type and stored in the file to a receiving side.

8 Claims, 3 Drawing Sheets

(56) References Cited

U.S. PATENT DOCUMENTS

| | | | |
|---|---|---|---|
| 2003/0119552 A1* | 6/2003 | Laumen et al. | 455/557 |
| 2004/0058648 A1* | 3/2004 | Layley et al. | 455/41.2 |
| 2004/0097248 A1* | 5/2004 | Schmidt et al. | 455/466 |
| 2004/0203945 A1* | 10/2004 | Qu et al. | 455/466 |
| 2004/0203956 A1* | 10/2004 | Tsampalis | 455/466 |
| 2004/0214551 A1* | 10/2004 | Kim | 455/412.1 |
| 2004/0242202 A1* | 12/2004 | Torvinen | 455/412.1 |
| 2005/0021803 A1* | 1/2005 | Wren, III | 709/231 |
| 2005/0054287 A1* | 3/2005 | Kim | 455/3.05 |
| 2005/0250520 A1* | 11/2005 | Johnson et al. | 455/466 |
| 2008/0094466 A1* | 4/2008 | Helvick | 348/14.01 |

FOREIGN PATENT DOCUMENTS

| | | |
|---|---|---|
| JP | 2000244918 | 9/2000 |
| JP | 2001109675 | 4/2001 |
| JP | 2001-177793 | 6/2001 |
| JP | 2003-174578 | 6/2003 |
| JP | 2004151772 | 5/2004 |
| JP | 2004-214915 | 7/2004 |

* cited by examiner

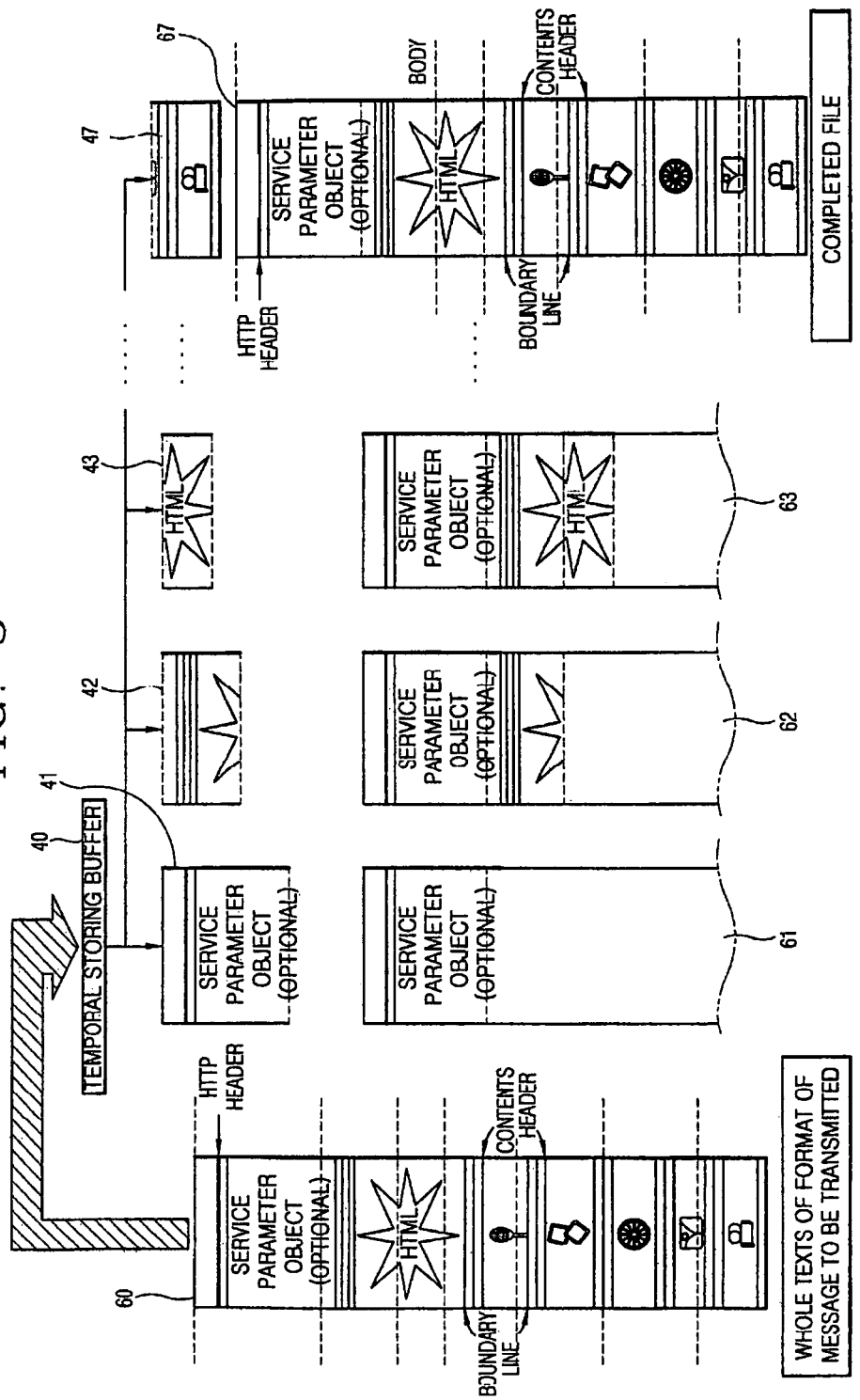

MESSAGE TRANSMITTING APPARATUS AND METHOD IN MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 2004-79261, filed on Oct. 5, 2004, the contents of which is hereby incorporated by reference herein in its entirety.

FIELD OF THE INVENTION

The present invention relates to a message transmitting apparatus and method in a mobile communication terminal.

BACKGROUND OF THE INVENTION

Mobile communication techniques have developed such that subscribers can transmit data of a large capacity with high speed using a mobile communication terminal. Unlike some related art techniques employing voice communication and short message services, multimedia services capable of transmitting multimedia data such as still images, long text messages, audio signals, moving images (video), and animation using a mobile communication terminal or an Internet e-mail service using the mobile communication terminal, are now are being provided to service subscribers.

FIG. 1 is a block diagram illustrating a mobile communication system for a multimedia messaging service (MMS) in accordance with the related art.

As shown in FIG. 1, the mobile communication system for an MMS comprises a plurality of mobile communication terminals 100 and 500 for providing a wireless call service to each subscriber from an end of a mobile communication network, transmitting an MMS message or an e-mail message created by a transmitting side subscriber, or transmitting the MMS message or the e-mail message to a receiving side subscriber. The mobile communication system also comprises a plurality of servers 200 and 400 for connecting the mobile communication terminals 100 and 500 by using a mobile communication network. The servers also provide an MMS or an e-mail service to the subscribers. The mobile communication system further comprises an MMS gateway 300 for performing the MMS or the e-mail service by connecting the servers 200 and 400 to each other.

If the transmitting side subscriber transmits an MMS message or an e-mail message through the mobile communication terminal 100, the server 200 receives the message to perform a certain process. The server 200 then transmits the message to the MMS gateway 300.

The MMS gateway 300 transmits the message of the transmitting side subscriber to the receiving side server 400 that manages the receiving side terminal 500. The receiving side server 400 then transmits the message to the mobile communication terminal 500 of the receiving side subscriber.

FIG. 2 is a flowchart illustrating a method for transmitting a message in a mobile communication terminal in accordance with the related art.

Referring to FIGS. 1 and 2, a multimedia message (or an e-mail message) is composed by the subscriber's instruction (S10). The mobile communication terminal 100 then stores the composed message in a memory region allocated for a message transmission service (S20).

The mobile communication terminal 100 has a memory having a capacity of approximately 8 megabytes, for example. Preferably, approximately 3 megabytes of the memory are allocated as a heap. Herein, a heap may be referred to as a priority queue indicating a memory region allocated to programs and recollected repeatedly. Whereas a stack region is strictly operated by a Last In First Out method, the heap does not have a certain specification regarding a size of a block requested by the programs or a request order (the number of times for request).

The mobile communication terminal 100 judges whether the size of the composed message exceeds a memory capacity at the time of storing the message (S30). If the size of the message exceeds the memory capacity, the mobile communication terminal 100 determines that an error has occurred and stops the message transmission (S50).

If an image of 3 megabytes is encoded for insertion into the message, the size of the message is increased to approximately 4.5 megabytes. However, since the memory size allocated for the message storage is limited to 3 megabytes, the encoding process of the mobile communication terminal 100 for composing a message is not normally performed. Particularly, a phenomenon, wherein a memory capacity is exceeded, frequently occurs in a mobile communication terminal having a camera with mega pixel capacity.

If the size of the message does not exceed the memory capacity at the time of storing the composed message, the mobile communication terminal 100 performs a normal message transmission (S40).

As aforementioned, the related problems result from the fact that the memory capacity allocated to transmit a message by the mobile communication terminal 100 is limited and the phenomenon of the memory capacity being exceeded frequently occurs.

Especially, in the process for transmitting a message in a mobile communication terminal having a camera of several mega pixels, the phenomenon of the memory capacity being exceeded frequently occurs such that the subscriber has to resize a corresponding image each time the phenomenon occurs.

SUMMARY OF THE INVENTION

The present invention is directed to an apparatus and method for transmitting a message in a mobile communication terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a message transmitting apparatus in a mobile communication terminal, the apparatus comprising a message generating unit for generating a message, a buffer for temporarily storing the generated message, a controller for dividing the message stored in the buffer into data blocks, wherein the controller converts a format of the data blocks into a type capable of being transmitted or received via a network and stores the data blocks into a file, and a transmitter for transmitting the message comprising the data blocks and stored in the file to a receiving side.

Preferably, the data blocks have a constant size. Also, the controller sequentially stores the data blocks into the file.

In one aspect of the invention, the controller converts a format of the data blocks into a multimedia document type used for exchanging electronic mail via an Internet connection. Alternatively, the controller converts a format of the data blocks into a multipurpose Internet mail extension (MIME) type. Preferably, the type of the data blocks capable of being transmitted or received via a network comprises an identifier for identifying contents.

In another aspect of the invention, the controller stores the file in an embedded file system (EFS) memory. Alternatively, the controller stores the file in an external memory. Preferably, the external memory is at least one of a smart card, a UIM (Universal Subscriber Identity Module) card and a SIM (Subscriber Identification Module) card.

Preferably, the message is a multimedia message service (MMS) message or an electronic mail message.

In a further aspect of the invention, the controller transmits the file including the message to the receiving side.

In another embodiment of the present invention, a message transmitting method in a mobile communication terminal comprises generating a message, temporarily storing the message in a buffer, dividing the message stored in the buffer into data blocks, converting a format of the data blocks into a type capable of being transmitted or received via a network, storing the data blocks into a file, and transmitting the message comprising the data blocks and stored in the file to a receiving side.

Preferably, the data blocks have a constant size. Also, the controller sequentially stores the data blocks into the file.

In one aspect of the invention, the format of the data blocks is converted into a multimedia document type used for exchanging electronic mail via an Internet connection. Alternatively, the format of the data blocks is converted into a multipurpose Internet mail extension (MIME) type. Preferably, the type of the data blocks capable of being transmitted or received via a network comprises an identifier for identifying contents.

In another aspect of the invention, the method further comprises storing the file in an embedded file system (EFS) memory. The method may also further comprise storing the file in an external memory. Preferably, the external memory is at least one of a smart card, a UIM (Universal Subscriber Identity Module) card and a SIM (Subscriber Identification Module) card.

Preferably, the message is a multimedia message service (MMS) message or an electronic mail message.

In a further aspect of the invention, the method further comprises transmitting the file including the message to the receiving side.

In another embodiment of the present invention, a message transmitting apparatus in a mobile communication terminal comprises a message generating unit for generating a message, a buffer for temporarily storing the generated message, a controller for dividing the message stored in the buffer into data blocks, wherein the controller converts a format of the data blocks into a type capable of being transmitted or received via a network, a storing unit for storing the message comprising the data blocks having the converted type in a file, wherein the controller reads the message stored in the file when a message transmission is requested, and a transmitter for transmitting the read message to a receiving side.

In another embodiment of the present invention, a message transmitting method in a mobile communication terminal comprises generating a message, storing the generated message in a buffer, dividing the generated message stored in the buffer into data blocks, converting a format of the data blocks into a type capable of being transmitted or received via a network, storing a portion of the generated message comprising the data blocks having the converted type and exceeding a storage capacity of the buffer in a file when the generated message has a size exceeding the storage capacity of the buffer, and transmitting the message stored in the buffer and the file to a receiving side.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 5 illustrates an exemplary file generating process in accordance with one embodiment of the present invention.

DETAILED DESCRIPTION OF THE PREFERRED EMBODIMENTS

The present invention relates to a message transmitting apparatus and method in a mobile communication terminal.

Reference will now be made in detail to the preferred embodiments of the present invention, examples of which are illustrated in the accompanying drawings.

Figure 1:
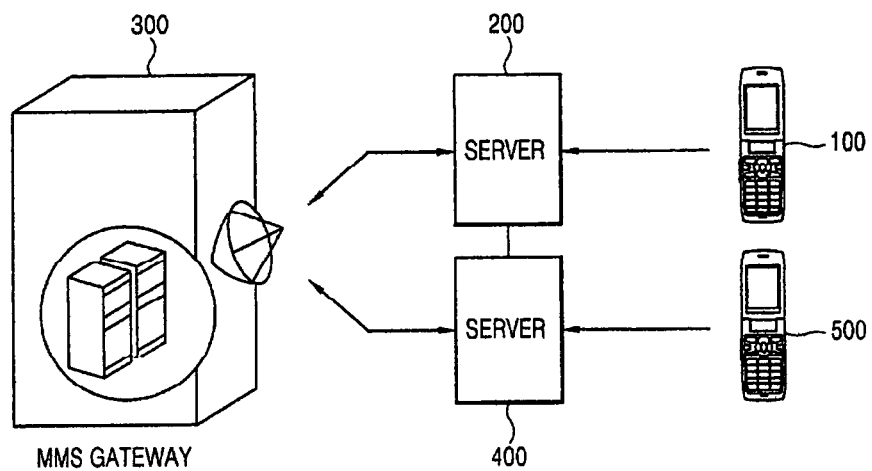
FIG. 1 is a block diagram illustrating a mobile communication system for a multimedia messaging service (MMS) in accordance with the related art.
Figure 2:
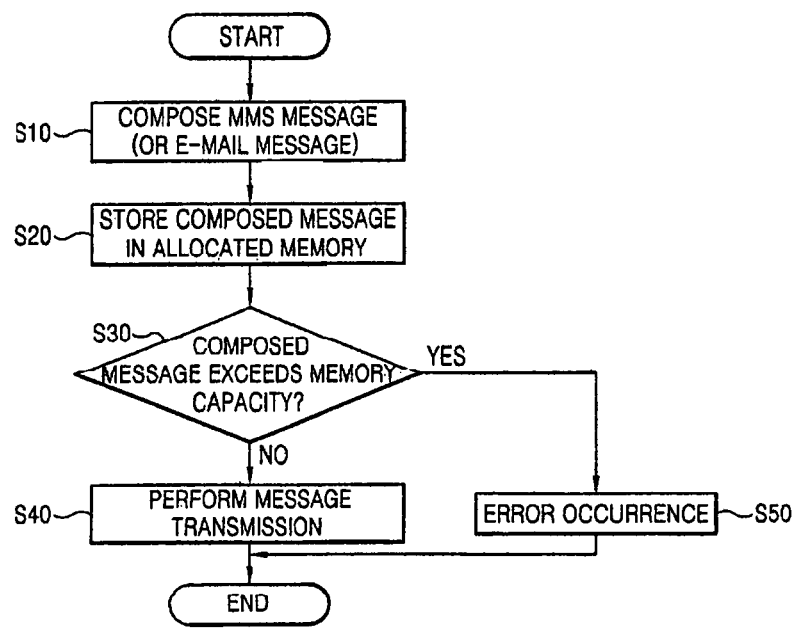
FIG. 2 is a flowchart illustrating a method for transmitting a message in a mobile communication terminal in accordance with the related art.
Figure 3:
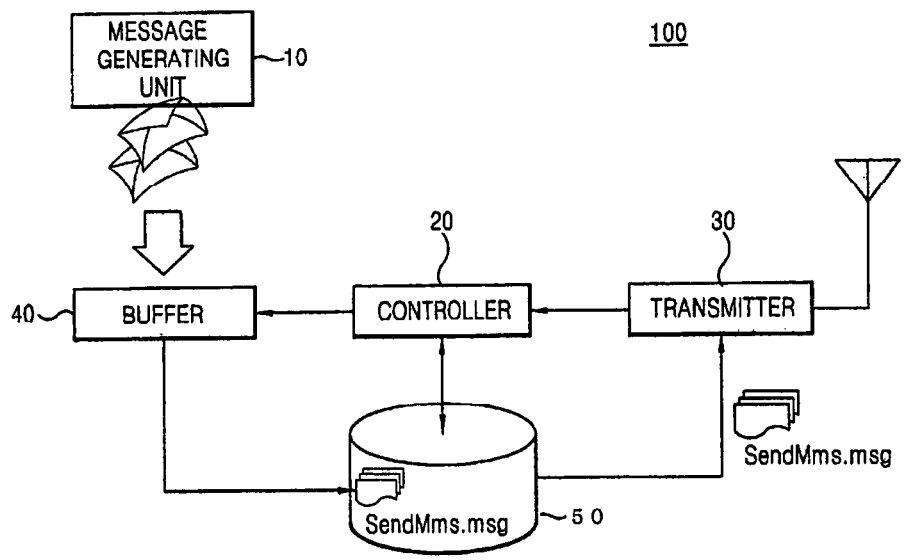
FIG. 3 is a block diagram illustrating an exemplary message transmitting apparatus of a mobile communication terminal in accordance with one embodiment of the present invention.

FIG. 3 is a block diagram illustrating an exemplary message transmitting apparatus of a mobile communication terminal in accordance with one embodiment of the present invention. As shown in FIG. 3, the message transmitting apparatus comprises a message generating unit 10 for generating a multimedia message (or an e-mail message) according to a subscriber's instruction, a controller 20 for converting a format of the generated message into a multipurpose Internet mail extension (MIME) type and storing the message in a file, and a transmitter 30 for transmitting the message stored in the file to a receiving side.

Figure 4:
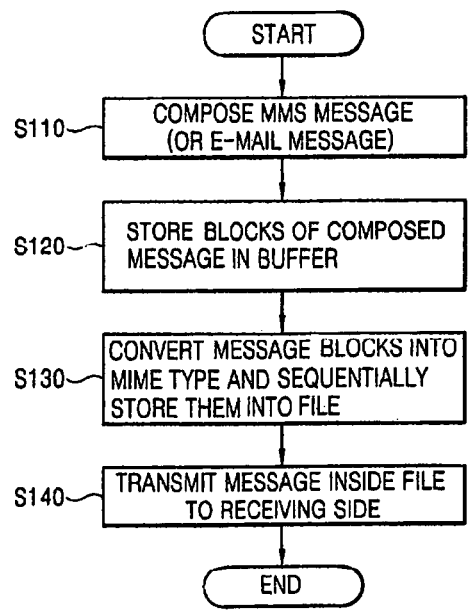
FIG. 4 is a flowchart illustrating an exemplary message transmitting method of a mobile communication terminal in accordance with one embodiment of the present invention.

FIG. 4 is a flowchart illustrating an exemplary message transmitting method in a mobile communication terminal in accordance with one embodiment of the present invention. Referring to FIGS. 3 and 4, an exemplary message transmitting method in accordance with one embodiment of the present invention will be explained.

First, if a message generating unit 10 generates a multimedia message (or an e-mail message) according to a subscriber's instruction (S110), a controller 20 stores the generated message in a buffer 40 (S120). The buffer 40 may be a static random access memory (SRAM) that temporarily stores the message before storing the message in a file.

When the generated message is stored in the buffer 40, the message is divided into data blocks of a constant size. The size of the data block is determined depending on the capacity of the buffer 40.

If the buffer 40 is filled with data blocks, the controller 20 converts a format of the data blocks into a multipurpose Internet mail extension (MIME) type and then sequentially stores the data blocks in a file such as a "SendMms.msg" type file. When all the data blocks have been stored in the file, that is, when all the texts of the message have been stored in the file, the controller 20 stores the file in an embedded file system (EFS) memory 50 (S130). The MIME is a specification for defining a type of a document (e.g., an e-mail or a multimedia message) for exchanging Internet mail, and is divided into various types (e.g., seven types) such as a text portion, a multipart portion, a message portion, an application portion, an image portion, an audio portion, and a video portion, for example.

The EFS memory 50 constitutes a memory part of a mobile communication terminal with a random access memory (RAM), and serves as a hard disk drive (HDD) of a personal computer. The EFS memory 50 can store a downloaded applet or a downloaded file. Also, the controller 20 can store the file in an external memory such as a smart card, a UIM (Universal Subscriber Identity Module) card, and a SIM (Subscriber Identification Module) card.

When the file including the message (e.g. SendMms.msg) has been stored in the EFS memory 50 through the steps S110 to S130, the controller 20 reads the message from the stored file to transmit the message to a transmitter 30. Then, the transmitter 30 transmits the message to a receiving side (S140). In some cases, the controller 20 may transmit the file including the message to the receiving side.

FIG. 5 illustrates an exemplary file generating process in accordance with one embodiment of the present invention. FIG. 5 shows a buffer 40 for temporarily storing data blocks of a message, a message format 60, and a process for sequentially storing data blocks (41 to 47) of a message in a file (e.g. SendMms.msg) (61 to 67) via the buffer 40.

Referring to FIG. 5, the message format stored in the file will be explained. A message may comprise a hypertext transfer protocol (HTTP) header, a service parameter object (optional), and a body. The body may include contents, a boundary line for representing a boundary between the contents, and a contents header. As shown in FIG. 5, the contents may include a hypertext markup language (HTML) code, audio (voice) data, an image, a text, and a moving image, for example.

As aforementioned, in the present invention, an MMS message (or an e-mail message) to be transmitted is stored in a file format. Accordingly, the related art problem of a message transmission being stopped when a message size exceeds a message capacity is solved.

Also, in the present invention, an additional memory region need not be allocated to a message to be transmitted. Thus, memory resources of the mobile communication terminal are more efficiently utilized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for transmitting a message in a mobile communication terminal, the apparatus comprising:
   a message generating unit configured to generate a message;
   a buffer configured to temporarily store the message;
   an embedded file system (EFS) memory that is physically independent of the buffer;
   a transmitter; and
   a controller configured to:
   determine that a size of the message generated by the message generating unit exceeds a storage capacity of the buffer;
   divide the message into a plurality of data blocks of a constant size such that a size of each of the plurality of data blocks is smaller than the storage capacity of the buffer;
   temporarily store in the buffer the plurality of data blocks sequentially, storing in the buffer only one data block at a time, such that the message is temporarily stored in a non-file format;
   while only one data block is stored in the buffer, convert a format of the data block into a multimedia document type used for exchanging electronic mail via an Internet connection or a multipurpose Internet mail extension (MIME) type;
   sequentially store the plurality of data blocks processed in the buffer into a file in the EFS memory; and
   cause the transmitter to transmit the file including the message comprising the plurality of data blocks to a receiving device by reading the message from the file stored in the EFS memory, wherein the message is a multimedia message service (MMS) message or an electronic mail message.

2. The apparatus of claim 1, wherein the plurality of data blocks comprises an identifier for identifying contents.

3. The apparatus of claim 1, wherein the MMS message comprises at least a still image, a long text message, an audio signal, a moving image, video, or an animation.

4. The apparatus of claim 1, wherein the buffer comprises a static random access memory (SRAM).

5. A method for transmitting a message in a mobile communication terminal, the method comprising:
   generating a message to be temporarily stored in a buffer in response to a user input;
   determining that a size of the generated message exceeds a storage capacity of the buffer;
   dividing the message into a plurality of data blocks of a constant size such that a size of each of the plurality of data blocks is smaller than the storage capacity of the buffer;
   temporarily storing in the buffer the plurality of data blocks sequentially, storing in the buffer only one data block at a time, such that the message is temporarily stored in a non-file format;
   while only one data block is stored in the buffer, converting a format of the data block into a multimedia document type used for exchanging electronic mail via an Internet connection or a multipurpose Internet mail extension (MIME) type;

sequentially storing, in an embedded file system (EFS) memory, the plurality of data blocks processed in the buffer into a file, wherein the EFS memory is physically independent of the buffer; and transmitting the file including the message comprising the plurality of data blocks to a receiving device by reading the message from the file stored in the EFS memory, wherein the message is a multimedia message service (MMS) message or an electronic mail message.

6. The method of claim 5, wherein the plurality of data blocks comprises an identifier for identifying contents.

7. The method of claim 5, wherein the MMS message comprises at least a still image, a long text message, an audio signal, a moving image, video, or an animation.

8. The method of claim 5, wherein the buffer comprises a static random access memory (SRAM).

* * * * *